United States Patent
Gracon et al.

[15] 3,703,794
[45] Nov. 28, 1972

[54] STRUCTURAL RETAINER CLIP

[72] Inventors: Andrew Gracon, Cleveland, Ohio; George A. Tinnerman, 3600 Stewart Avenue, Miami, Fla. 33133

[73] Assignee: said Tinnerman, by said Gracon

[22] Filed: April 28, 1970

[21] Appl. No.: 32,519

[52] U.S. Cl. ..................52/506, 24/73 B, 52/714, 52/622
[51] Int. Cl. ..............................................E04b 1/40
[58] Field of Search.......52/506, 714, 715; 24/16 PB, 24/73 B, 81 B, 230 SC, 230 SL; 248/72, 216, 228, 229, 226 R, 226 E

[56] References Cited

UNITED STATES PATENTS

| | | | |
|---|---|---|---|
| 492,131 | 2/1893 | Adams | 24/230 SL |
| 964,376 | 7/1910 | Blackburn | 248/216 |
| 1,531,916 | 3/1925 | Flintjer | 287/20 |
| 1,674,212 | 6/1928 | Loucks | 248/228 |
| 1,783,391 | 12/1930 | Schorr et al. | 52/714 |
| 1,940,505 | 12/1933 | Paulick | 24/81 B |
| 2,683,022 | 7/1954 | Molow | 248/226 R |
| 2,765,887 | 10/1956 | Horowitz | 52/520 |

FOREIGN PATENTS OR APPLICATIONS

| | | | |
|---|---|---|---|
| 15,677 | 8/1901 | Great Britain | 24/230 |
| 822,087 | 10/1959 | Great Britain | 52/506 |
| 535,683 | 7/1952 | Canada | 24/73 B |
| 952,299 | 11/1956 | Germany | 52/715 |
| 435,759 | 5/1948 | Italy | 248/226 E |

Primary Examiner—Frank L. Abbott
Assistant Examiner—Leslie A. Braun
Attorney—Revere B. Gurley

[57] ABSTRACT

The structural retainer clip formed by a hardened, resilient sheet metal clip element having a pair of opposed flanges connected by a base, and a connector element connected to the side of the center section of the base opposite the flanges. The flanges of the clip element are formed with teeth to grip a support member embraced by the flanges, such as a corrugation of a corrugated deck, when the flanges are spread by forcing the clip element on to the support member. The connector element is provided with retainer means to secure an article to the support member, the force exerted by the article being transmitted through the connector element to the center section of the base, and acting to fulcrum the side sections about curved sections which join the side flanges to the base, thereby augmenting the frictional engagement of the teeth of the flanges.

15 Claims, 22 Drawing Figures

PATENTED NOV 28 1972

INVENTORS
ANDREW GRACON
GEORGE A. TINNERMAN

BY Revere B. Gurley
ATTORNEY

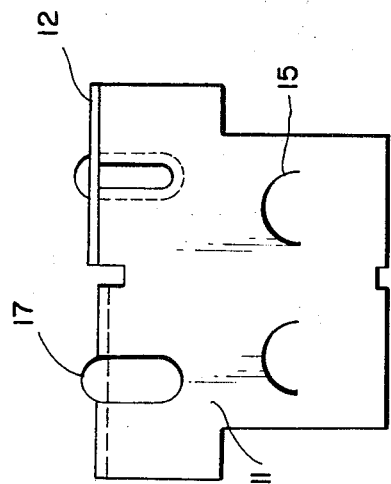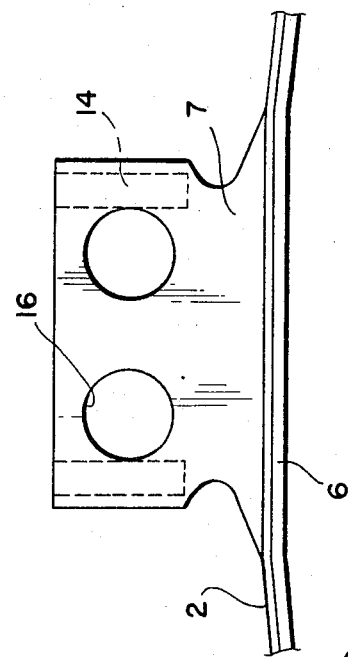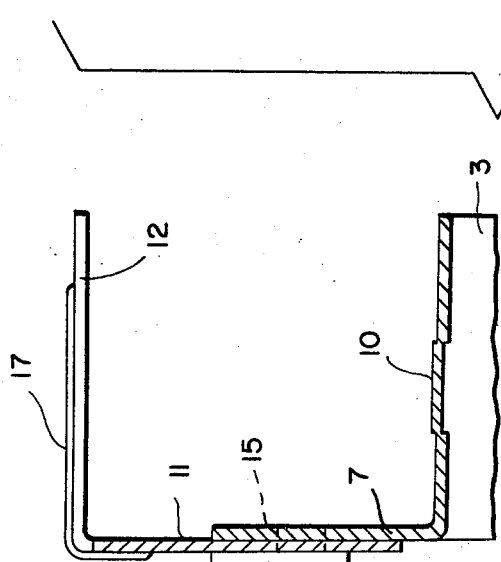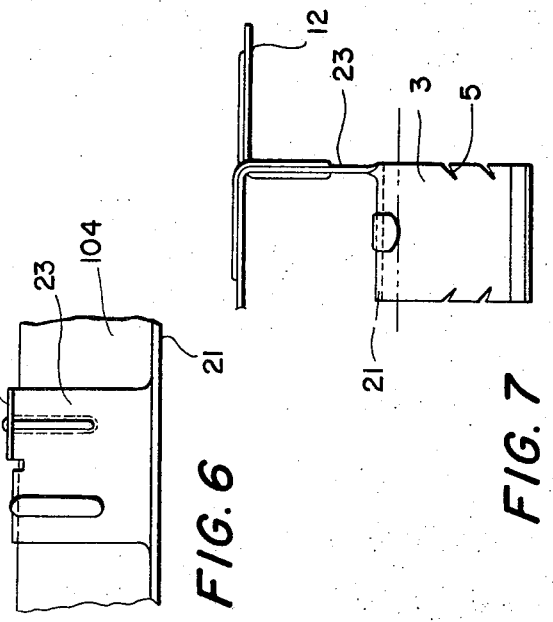

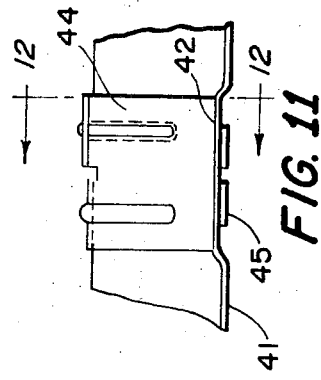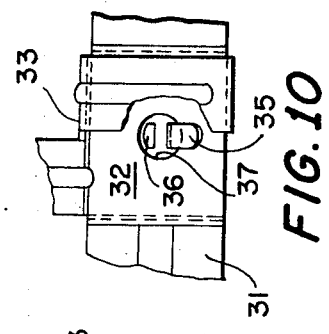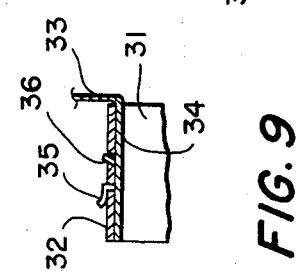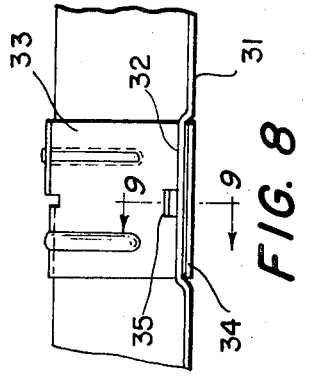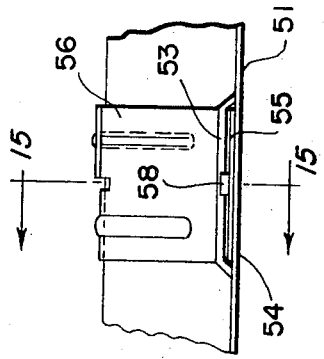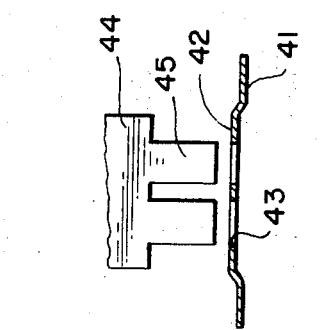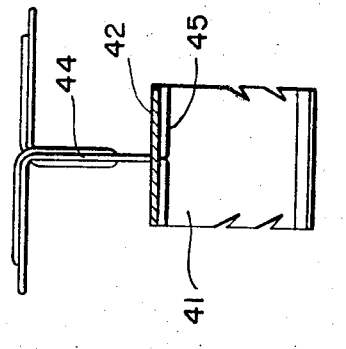

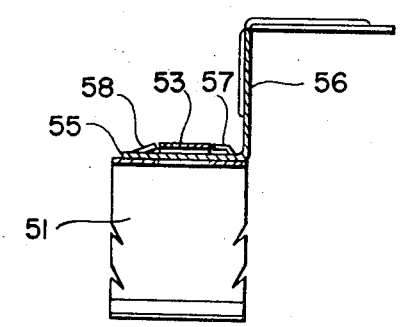
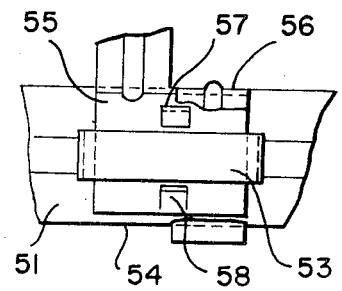
FIG. 15　　　　　　FIG. 16
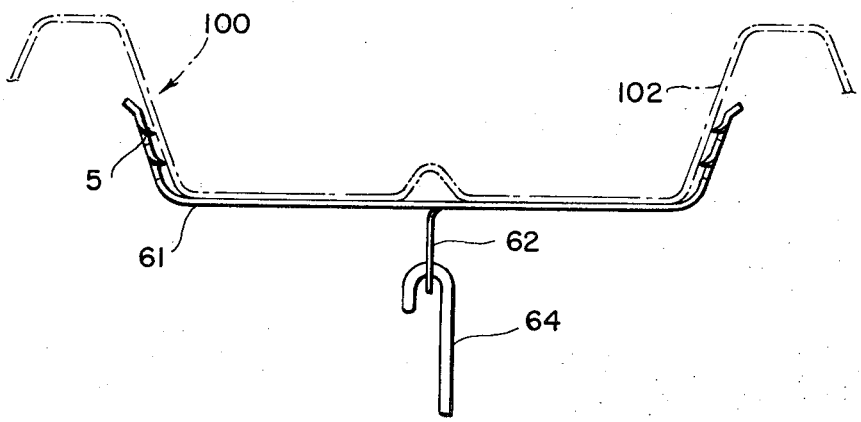
FIG. 17
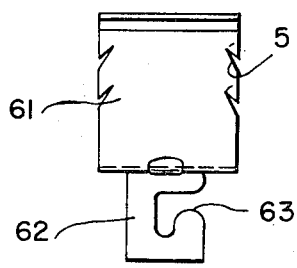
FIG. 18
INVENTORS
ANDREW GRACON
GEORGE A. TINNERMAN
BY　*Revere B. Gurley*
ATTORNEY

STRUCTURAL RETAINER CLIP

NATURE AND OBJECTS OF INVENTION

This invention relates to a sheet metal retainer clip formed to engage a support structure and to secure a member to said structure.

The object of this invention is to produce a strong, efficient, inexpensive and easily applied structural retainer clip which is constructed to engage securely a support member such as a corrugated roof deck and to act so that the force exerted by a connected article augments the engagement of the clip with the support member. The clip can be readily stamped out of sheet metal, the clip element being formed to grip a support member firmly, the article connecting element acting on the clip element to augment its grip of the support member.

The retainer clip combines a clip element which is designed to engage a support member with a connector element having retainer means to hold a panel or other article on the support member, the connector element acting on the clip element to augment its engagement with the support member. The clip element embraces and grips the support member, herein illustrated as a corrugation of a corrugated deck by way of example, and the force exerted by the connector element through action of the article supported, increases the gripping effect of the clip element.

The clip element is made in the form of a channel shape member, the side flanges having teeth which extend inwardly and are directed toward the base of the channel to engage a support structure embraced by the flanges. The central section of the base of the clip has a connector portion extending in the opposite direction from the flanges. The base of the clip slopes or is inclined at an acute angle from the central section toward the flanges, and the side sections are joined to the flanges by curved sections. The clip is forced onto a support member by pressure on said base, the force flattening the base and increasing the engagement of the teeth with the structure. At the same time, any force exerted outwardly on the connector element will cause the flanges to fulcrum about the curved sections and further increase the engagement of the teeth.

THE DRAWINGS

FIG. 4 is a cross section on line 4—4 of FIG. 2.

FIG. 5 is an exploded view of two parts of the connector section forming the complete clip.

FIG. 6 is a fragmentary elevation of a second form of retainer clip.

FIG. 7 is a side elevation of the clip of FIG. 6.

FIG. 8 is a fragmentary elevation of a third form of clip.

FIG. 9 is a section on line 9—9 of FIG. 8.

FIG. 10 is a fragmentary top view of the clip of FIG. 9, with parts broken away.

FIG. 11 is a fragmentary elevation of a fourth form of clip.

FIG. 12 is a section on line 12—12 of FIG. 11.

FIG. 13 is an exploded view of the elements forming the clip of FIG. 11 before assembly.

FIG. 14 is a fragmentary elevation of a fifth form of clip.

FIG. 15 is a section on line 15—15 of FIG. 14.

FIG. 16 is a top view of the clip of FIG. 14, with parts broken away.

FIG. 17 shows a sixth form of clip secured on a support structure with an article suspended on the clip.

FIG. 18 is a side elevation of the clip of FIG. 17.

DESCRIPTION OF THE INVENTION

Figure 1:
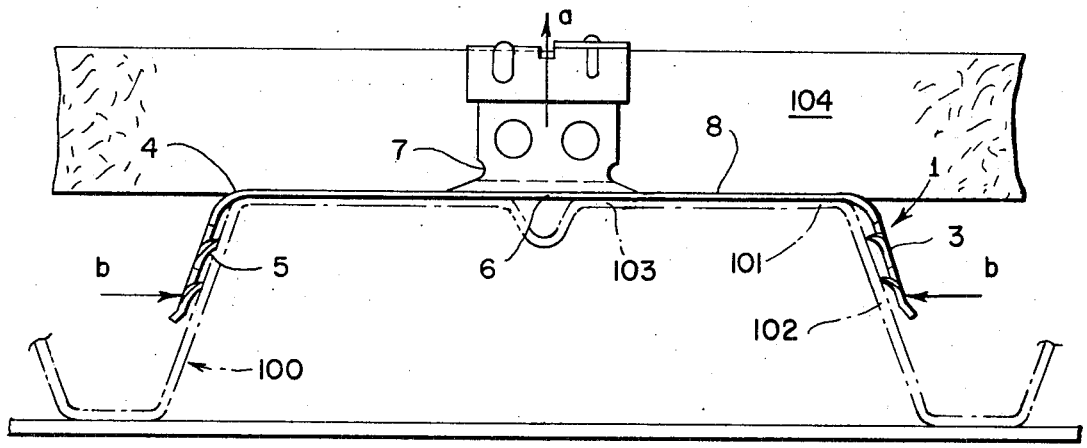
FIG. 1 shows the clip secured on a support structure, with an article secured to the structure by the clip.
Figure 2:
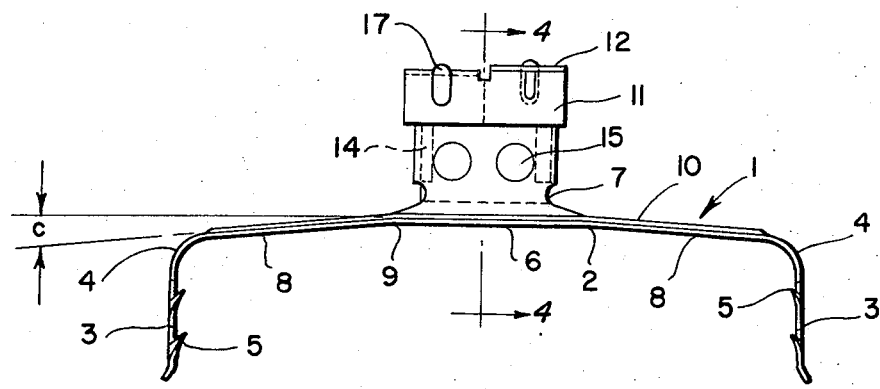
FIG. 2 is an elevation of the clip.
Figure 3:
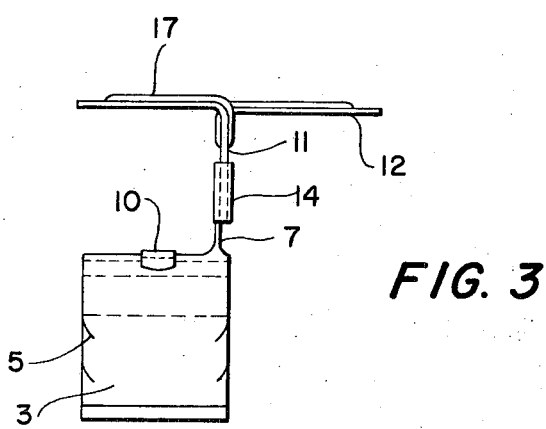
FIG. 3 is a side elevation of the clip, at right angles to FIG. 2.

The retainer clip 1 of the invention is shown in FIG. 1 secured on the corrugation 101 of a corrugated metal deck structure 100, with the retainer clip holding panel members 104 on the structure. In its initial form, the clip is shown in FIG. 2, the base 2 having two flanges 3 joined to it by curved sections 4. These flanges, shown for engagement with the converging walls 102 of the corrugation 101, are substantially perpendicular to the base 2, so that they may be forced outwardly when pressed or driven onto the corrugation 101. These flanges 3 may, for other purposes, be formed to converge or diverge, according to the structure for which they are designed, the important feature being that they are expanded or forced apart when driven on the structure.

Sharply pointed teeth 5 on these flanges engage the support member 100 and bite into the member to prevent removal. These teeth 5 are struck out from the flanges 3 to extend inwardly toward the center of the channel and are directed toward the base 2. When the clip element is pressed or driven on to the corrugation 101, the angle of the teeth to the wall tends to increase with flexing of the flanges; at the same time the teeth 5 are stressed, thereby increasing the frictional engagement of the teeth with the walls 102 of the corrugation.

The base 2 has a central section 6, to which the connector element 7 is joined, and the side sections 8, extending at an angle $c$ at 9 from the central section, slope or are inclined from the central section to the flanges 3 and curved sections 4. This formation of the base 2 causes the side sections 8 of the base to be flattened when pressed into contact with the base wall 103 of the corrugation 101, as will be seen in FIG. 1. An embossed rib 10 extends the full length of the base and increases the stress developed when the base is flattened. The stress thus created by the deformation of the base 2 of the clip element is resisted by the flanges 3 in engagement with the walls 102 of the corrugation, so that the engagement of the teeth 5 with the walls is further increased. At the same time, a force exerted outwardly on the connector element 7 and the central section 6 will tend to fulcrum the flanges 3 about the curved sections 4, further augmenting the biting engagement of the teeth 5.

In this form of the invention, one part of the connector element 7 is integral with the center section 6, and the other part 11 is formed with retainer members 12 to hold and secure articles to the support member. The members 12, which are in the form of flat, outwardly extending legs, are integral with the part 11 of the connector element 7. The connector part 11 telescopes in flanges 14 on the other part of the connector element and is formed with struck out projections 15 which engage in recesses 16 in the other part of the connector element. The projections 15 are inclined from the plane of the connector part 11, so that they may be flexed when forced into the other part and will resume their position in the recesses 16 and prevent separation of the two connector parts and the two clip elements.

The retainer members 12 in the specific form used to illustrate the invention, are flat legs extending in opposite directions from the connector element and are perpendicular to the element, so that they are parallel to the central section 6 of the base 2 of the clip. These members may overlie panels 104 and retain them in place on the corrugated deck structure 100. The legs and connector element have ribs 17 embossed the lengths of the legs and into the connector element to strengthen the retainer members.

The clip 1 with the integral portion of connector element 7 shown in FIGS. 1 to 5 is initially stamped out of a single piece of sheet metal, including the teeth 5, and bent into shape. For most applications, the clip is then hardened to produce a resilient, hardened element with the hardened biting teeth. The flattening of the base 2 with the resilience of the material increases the frictional engagement of teeth 5. The connector element 7 may exert a force on the center section of the base when engaged by an article, this force causing a fulcrum action of the base sections about curved portions 4, further augmenting the frictional grip of teeth 5.

In the retainer clip 21 of FIGS. 6 and 7, the connector element 23 is integral with the clip element and the retainer members 12. This retainer clip 21 may be stamped out of one piece of sheet metal, and after bending to the shape shown, the entire clip is hardened to produce a clip of resilient, hardened material. When the flanges 3 grip the support member as in FIG. 1, the teeth 5 will bite into the member and the force exerted by an article held by retainer members 12 will increase the grip of flanges 3 and teeth 5.

The clip shown in FIG. 8, 9 and 10 is made of two parts, the connector element 33 being made separately from the clip element 31. The two elements are readily stamped out of sheet metal and bent into their final form. The center section 32 of the base of the clip element 31 is raised sufficiently to provide space for a bent end 34 of connector element 33 between the center section and the support structure. This center section is apertured at 37. The end 34 bent over from the body of connector element 33 has two lugs 35, 36 struck out from the material of the end. The lug 35 is raised and bent over parallel to the end, to project through and overlie the edge of the aperture 37 in end 33. Slightly spaced from the base of lug 35 is a lug 36 struck out from the end 34. These lugs are so formed that the lug 35 may be inserted through the aperture 33 and lug 36 will then engage the opposite edge of the aperture to prevent movement of the connector element on the clip element when the two elements are positioned in flat contact.

Another form of two-part retainer clip is shown in FIGS. 11, 12 and 13. The base of clip element 41 is formed with a raised center section 42 having one or more apertures 43. The connector element 44 has one or more tabs 45 corresponding to apertures 43 which are inserted in the apertures and bent over to secure the connector element 44 to the clip element 41.

The retainer clip in FIGS. 14, 15 and 16 is also made in two parts. The center section of the base of the clip element 51 is formed with a narrow, raised strip 53 struck up from the base, to space the strip from the side portions 54 of the center section. The bent end 55 of the connector element 56 is formed with projections 57, 58. This end slides between the strip 53 and side portions 54 of the center section of the clip element, the inclined lug 58 struck up from the end being pressed down as the end is slid into position, and then springing up to prevent withdrawal of the connector element. The lug 57 raised from the end 55 acts as a stop to position the end on the clip element.

Figure 19:
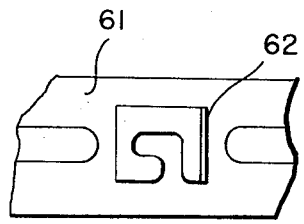
FIG. 19 is a fragmentary bottom view of the clip of FIG. 17.

In FIGS. 17, 18 and 19 the retainer clip is used as a suspended supporting member. The clip element 61 has the connector element 62 formed integral therewith by punching and bending the hook-like element 62 with the slot 63 out of the center section of the clip element 61. The entire clip is then treated to harden the material and increase its resilience. A suspended article 64 may engage in the slot 63 of connector element 61 when the clip element has been pressed or driven on to the corrugated deck member 100. As in the other forms of the invention, the force exerted on connector element 62 will act on the center section of the base to fulcrum the side sections and flanges of the clip element and augment the engagement of the teeth 5 with the walls 102 of the corrugation.

Figure 21:
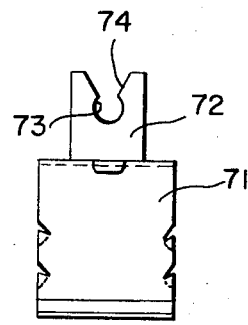
FIG. 21 is a side elevation of the clip of FIG. 20.
Figure 20:
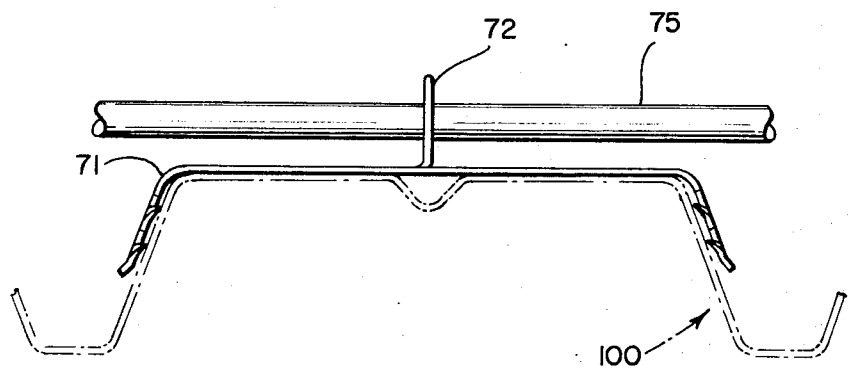
FIG. 20 shows a seventh form of clip secured on a support structure with an article secured by the clip.
Figure 22:
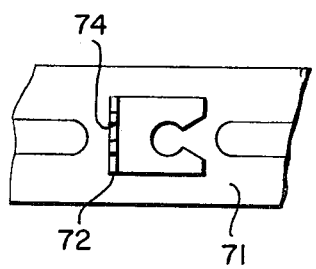
FIG. 22 is a fragmentary top view of the clip of FIG. 20.

The clip may also be formed to support an article on top of a corrugated deck member as shown in FIGS. 20, 21 and 22, the clip element being pressed on to a corrugation of member 100. The clip element 71 is formed with a tab 72 struck out of the center section of the base of the clip element, the connector element or tab 72 having an aperture 73 opening to a notch 74. A pipe 75 may engage in the aperture by forcing the pipe through the notch and into the aperture, the resilient material of the connector element allowing the sides of the notch 74 to spread to admit the pipe. As in other forms of the invention, the clip may be treated to harden the material and increase its resilience.

The clip element has the important action of increasing the gripping effect of the teeth 5 when an article held by the connector element exerts a force on the center section of the base portion. The force exerted on the center section 6 of the clip element through the connector element (arrow a in FIG. 1) acts on the side sections 2 to fulcrum side flanges 3 about the corner sections 4, thereby increasing the force of the teeth on the support member (arrows b in FIG. 1). The hardened, resilient material of the clip element is a contributing factor to this action by reducing deformation of the clip element under forces connecting an article to the support member. The inclined side sections 2 and reenforcing rib 10 further assure a strong gripping action by the teeth and their flanges.

The clip element in all forms of the invention is easily formed by punch and press operation from one piece of sheet metal, so that this element may be manufactured very rapidly and inexpensively. At the same time, the clip may be applied with conventional tools in a quick, easy operation. These characteristics of efficiency in use, ease of application and simplicity and low cost of manufacture are important to the success of this fastener.

We claim:

1. A sheet metal retainer clip comprising a channel shape clip element of hardened, resilient material for embracing a corrugation of a corrugated deck, said clip having opposed side flanges for resiliently gripping the side walls of the corrugation and a base portion extending between said side flanges, said base portion being formed by a flat center section and flat side sections sloping outwardly from said center section at a small, acute angle and integrally joined to said side flanges at a much greater angle to the plane of said center section, said side flanges extending from said base portion a substantially greater distance than the depth of said base portion with its sloping side sections and having inwardly extending sharp, pointed teeth directed toward said base portion engaging the side walls of the corrugation, said base when flattened against the bottom of said corrugation exerting a stress on said flanges to increase the engagement of said teeth, and a connector element fixed to said center section and extending from the center section of said base portion in the opposite direction from said side flanges and having retainer means spaced from said base portion to retain an article for connection to said support member.

2. A sheet metal retainer clip as claimed in claim 1, in which said clip element is formed from one piece of sheet metal and is hardened to provide resilience and to harden the pointed teeth.

3. A sheet metal retainer clip comprising a channel shape clip element of resilient sheet metal having opposed side flanges for resiliently gripping a support member and a base portion extending between said side flanges, said base portion being formed by a flat center section and flat side sections integrally connected to and sloping outwardly from said center section at a small, acute angle to the plane of said center section and integrally joined to said side flanges by curved portions and at a much greater angle, said side flanges extending from said base portion a substantially greater distance than the depth of said base portion with its sloping side sections and having inwardly extending sharp, pointed teeth directed toward said base portion, and a connector element fixed to said center section and extending in the opposite direction from said side flanges and having retainer means at its opposite end to retain an article for connection to said support member.

4. A retainer clip as claimed in claim 3, in which said clip is forced on a structure under pressure to engage the central section with the support structure and to flatten said base and thereby increase the grip of said teeth on said structure.

5. A retainer clip as claimed in claim 4, in which said retainer means are two flat legs extending in opposite directions perpendicular to said connector element.

6. A retainer clip as claimed in claim 4, in which said connector element is formed by two telescoping members, said members having interengaging projections and recesses.

7. A retainer clip as claimed in claim 4, in which the connector element comprises an integral flange perpendicular to said center section.

8. A retainer clip as claimed in claim 4, in which said connector element is formed as a flat tab struck out of said center section and bent at a right angle to said center section.

9. A retainer clip as claimed in claim 4, in which said connector element and retainer means are integral with said clip element formed out of one piece of sheet metal with said clip element.

10. A retainer clip as claimed in claim 4, in which said center section is formed with a strip raised above the body of the section and the connector element has an end bent at a right angle to underlie the strip and is formed with projections to engage opposite edges of said strip to hold said connector portion to said clip element.

11. A retainer clip as claimed in claim 4, in which said center section has an apertured raised portion, and said connector element has an end bent at right angles to underlie said raised portion and is formed with projections engaging in the aperture of said center section.

12. A retainer clip as claimed in claim 4, in which the connector element is formed separately from said clip element, said center section and said connector element being formed with interengaging abutments.

13. A retainer clip as claimed in claim 4, in which said center section is apertured, and the connector element is formed with projections passed through said center section and bent over to secure the connector element to the clip element.

14. In a building structure, a corrugated structure having corrugations each of which has side walls converging outwardly and a flat intermediate base, a sheet metal panel retainer clip comprising a clip element secured to said corrugation having a base in contact with the base wall of said corrugation and two side flanges on opposite sides of said base in engagement with the side walls of said corrugation, said base being formed of a central section and side sections joining said side flanges to said central section, said side flanges having opposed, inwardly extending, sharp, pointed teeth directed toward the base of the clip element with their points frictionally engaging said side walls, a connecting element extending from the central section of the base of said clip in the opposite direction from said flanges, and retainer means on the other end of said connecting element to secure a member to said corrugated structure, the base of said channel shape clip element being normally inclined slightly in opposite directions from its central section toward the side flanges, said base of said clip being flattened into a plane in contact with said base wall of said corrugation to stress the inwardly diverging side flanges of said clip element in contact with said outwardly converging side walls and increase their frictional engagement of said teeth with the side walls of said corrugation.

15. In a building structure, as claimed in claim 14, in which the side sections of said base are joined to said side flanges by curved portions.

* * * * *